United States Patent
Peeters et al.

(10) Patent No.: US 8,425,052 B2
(45) Date of Patent: Apr. 23, 2013

(54) ILLUMINATION SYSTEM, METHOD AND PROJECTION DEVICE FOR CONTROLLING LIGHT EMITTED DURING A SPOKE TIME PERIOD

(75) Inventors: Martinus Petrus Joseph Peeters, Eindhoven (NL); Marcellus Jacobus Johannes Van Der Lubbe, Eindhoven (NL); Elvira Johanna Maria Paulussen, Eindhoven (NL); Daniel Anton Benoy, Eindhoven (NL); Jan De Graaf, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 325 days.

(21) Appl. No.: 12/744,077

(22) PCT Filed: Apr. 23, 2008

(86) PCT No.: PCT/IB2008/051550
§ 371 (c)(1),
(2), (4) Date: May 21, 2010

(87) PCT Pub. No.: WO2009/069010
PCT Pub. Date: Jun. 4, 2009

(65) Prior Publication Data
US 2010/0315604 A1    Dec. 16, 2010

(30) Foreign Application Priority Data
Nov. 28, 2007 (EP) .................................. 07121712

(51) Int. Cl.
*G03B 21/14* (2006.01)
*G03B 21/26* (2006.01)

(52) U.S. Cl.
USPC .............................................. 353/84; 353/30

(58) Field of Classification Search .................... 353/30, 353/31, 84, 122; 362/2, 293, 510; 348/342, 348/786; 359/308, 722, 723, 885
See application file for complete search history.

(56) References Cited

U.S. PATENT DOCUMENTS

| 6,309,070 B1 | 10/2001 | Svetliza et al. |
| 6,324,006 B1 | 11/2001 | Morgan |
| 6,402,347 B1 | 6/2002 | Maas et al. |
| 7,128,441 B2 | 10/2006 | Monch |

(Continued)

FOREIGN PATENT DOCUMENTS

| WO | 9724871 A2 | 7/1997 |
| WO | 2007000887 A1 | 1/2007 |

*Primary Examiner* — Pascal M Bui Pho
(74) *Attorney, Agent, or Firm* — Mark L. Beloborodov

(57) ABSTRACT

The invention relates to an illumination system (100), a projection device, and a color wheel (20, 22, 24). The illumination system comprises a light source comprising a first light-emitting unit (50) and a second light-emitting unit each emitting light towards a light output window (110). The illumination system comprises the color wheel including a spoke (40) between two adjacent color segments. The system is configured to prevent the spoke when transiting the optical path (80) between the light source and the light output window to simultaneously transit a first optical path between the first light-emitting unit and the light output window and a second optical path between the second light-emitting unit and the light output window. The illumination system further comprises a drive unit (92) which is configured for switching off the first light-emitting unit during a time interval (p1) when the spoke transits the first optical path.

14 Claims, 9 Drawing Sheets

U.S. PATENT DOCUMENTS

| | | |
|---|---|---|
| 7,210,821 B2 | 5/2007 | Keng |
| 2002/0044445 A1* | 4/2002 | Bohler et al. ......... 362/293 |
| 2005/0128441 A1* | 6/2005 | Morgan ......... 353/102 |
| 2006/0002109 A1* | 1/2006 | Imade ......... 362/231 |
| 2006/0087847 A1 | 4/2006 | Yamanaka |
| 2007/0019408 A1 | 1/2007 | McGuire, Jr. et al. |
| 2007/0024946 A1 | 2/2007 | Panasyuk et al. |
| 2007/0035703 A1 | 2/2007 | Hoffman |

* cited by examiner

ILLUMINATION SYSTEM, METHOD AND PROJECTION DEVICE FOR CONTROLLING LIGHT EMITTED DURING A SPOKE TIME PERIOD

FIELD OF THE INVENTION

The invention relates to an illumination system for controlling light emitted during a spoke time.

The invention also relates to a projection device comprising the illumination system, and to a color wheel for use in the illumination system.

BACKGROUND OF THE INVENTION

Illumination systems for projection devices are known per se. They are used, inter alia, in projection devices such as beamers and projection televisions. In such an image projection system, the light generated in the illumination system impinges on an image creation unit, for example, a Liquid Crystal Display (further also indicated as LCD) or, for example, a Digital Light Processing unit (further also indicated as DLP) or, for example, a Liquid Crystal on Silicon (further also indicated as LCoS) after which the image is projected on to a screen or wall. The illumination systems for projection devices typically emit light in a sequence of colors of light which is repeated over time. Each of the subsequent colors of light is used in the projection device to generate a partial image. The image is generated by subsequently superposing the partial images on the screen. The quality of such an image projection device is often indicated by the brightness of the image which can be produced.

One way of emitting the sequence of colors of light by the known illumination system is by using a color wheel. The color wheel is generally arranged between a light source of the illumination system and a light output window of the illumination system. The color wheel comprises a plurality of color segments which determine the sequence of colors of the light emitted by the illumination system by sequentially positioning color segments from the plurality of color segments between the light source and the light output window.

A drawback when using the color wheel having a plurality of color segments is that the color of the light emitted by the known illumination system constantly changes during a so called spoke time. The spoke time is a time interval during which a boundary between two adjacent color segments passes between the light source and the light output window. The constant changing of the color of the light during the spoke time causes undesired color effects in the image produced by the projection device.

One way of overcoming constant changing of the color during the spoke time is to simply switch off the light source during a spoke time. However, switching off the light during the spoke time reduces the brightness of the illumination system which is very undesirable for projection devices. So, alternative illumination systems have been developed to optimally use the light which is emitted during the spoke time. For example, the US patent application US2007/0035703 provides a system for actively compensating for the spoke light. The cited US patent application improves the technique known as spoke light recovery (SLR) which may be employed to use light generated during spoke times. The known illumination system comprises a light source configured to generate a first light level during a non-spoke time of a color wheel. The system further comprises a photodiode assembly configured to measure the first light level to generate a non-spoke light level. A processor is configured to set a spoke light compensation value based on the non-spoke light level. The light generated during the spoke time for a particular pixel is employed if the shade of that particular pixel includes a red, green and blue light level that are each above a threshold. Further, to facilitate smoother transition between non-SLR and SLR and vice versa, the video unit may be configured to subtract some portion of the light generated during the non-spoke times to compensate for the additional light output during the spoke times. This compensation factor is referred to as the spoke time compensation value.

A disadvantage of the known system is that it requires considerable calculating power to use part of the light emitted during the spoke time.

SUMMARY OF THE INVENTION

It is an object of the invention to provide an illumination system which emits light during the spoke time which can easily be used by the projection device while having a reduced complexity.

According to a first aspect of the invention the object is achieved with an illumination system for a projection device, the illumination system comprising a light source, a color wheel and a drive-unit for driving the light source, the color wheel comprising a plurality of color segments determining a color of the light emitted by the illumination system, the color wheel being configured for sequentially positioning color segments from the plurality of color segments in an optical path between the light source and the light output window by rotating the color wheel, a spoke of the color wheel being a boundary between two adjacent color segments, the light source comprising a first light-emitting unit and a second light-emitting unit each emitting light towards a light output window of the illumination system, the first light-emitting unit, the second light-emitting unit and the spoke being configured for preventing the spoke when transiting the optical path between the light source and the light output window to simultaneously transit a first optical path between the first light-emitting unit and the light output window and a second optical path between the second light-emitting unit and the light output window, the drive-unit being configured for switching off the first light-emitting unit during a time interval when the spoke transits the first optical path.

The spoke time according to the conventional system is the time during which the spoke transits between the light source and the light output window. The effect of the measures according to the invention is that by configuring the drive-unit to switch off the first light-emitting unit during a first part of the spoke time being the time interval during which the spoke transits the first optical path, the light emitted by the illumination system according to the invention is determined by the second light-emitting unit. Because the first light-emitting unit, the second light-emitting unit and the boundary are configured for preventing the spoke to simultaneously transit the first optical path and the second optical path, the second light-emitting unit together with the associated part of the color segment determine the color of the light emitted by the illumination system which remains substantially constant during the first part of the spoke time. So due to the substantially constant color of the light emitted during the first part of the spoke time, this light can relatively easily be used by the projection device without complex compensating algorithms for actively compensating for the spoke light.

The light source may comprise a third light-emitting unit and further light-emitting units. Preferably, the first light-emitting unit, the second light-emitting unit, the third light-emitting unit, any further light-emitting unit and the spoke are configured for preventing the spoke to simultaneously transit the first optical path, the second optical path, a third optical path between the third light-emitting unit and the light output window and any further optical path between a further light emitting unit and the light output window. By switching the second light-emitting unit off during a time interval when the spoke transits the second optical path, the third and possibly further light-emitting units remain switched on and emit light having a determined color. This again causes the light emitted during the spoke time to have a substantially constant color and thus the light emitted during the spoke time may relatively easily be used by the projection device.

In an embodiment of the illumination system, a positioning of the first light-emitting unit with respect to the second light-emitting unit prevents the spoke to simultaneously transit the first optical path and the second optical path, or wherein a shape of the spoke prevents the spoke to simultaneously transit the first optical path and the second optical path.

In an embodiment of the illumination system, the drive-unit is further configured for increasing an intensity of the light emitting by the second light-emitting unit during the switching off of the first light-emitting unit. A benefit of this embodiment is that the increase of the intensity of the light emitted by the second light-emitting unit enables the intensity of the light emitted by the illumination system during the first part of the spoke time to be substantially equal to the intensity of the light emitted by the illumination system outside the spoke time. Generally, the cooling of the light source is critical. Especially when using light emitting diodes as the first light-emitting unit and the second light-emitting unit, the maximum intensity of the light emitted by the first light-emitting unit and the second light-emitting unit strongly depends on the cooling of the light emitting diodes. Due to the switching off of the first light-emitting unit during the first part of the spoke time, the first light-emitting unit does not need to be cooled during the first part of the spoke time, allowing more cooling capacity to the light emitting diode of the second light-emitting unit. As a consequence, the power of the second light-emitting unit may be boosted resulting in an increase of the intensity of the light emitted by the second light-emitting unit.

In an embodiment in which the illumination system comprises a third light-emitting unit and further light-emitting units, the boosting of the second light-emitting unit may be simultaneous with the boosting of the third light-emitting unit and the further light-emitting unit to allow the compensation for the switching off of the first light-emitting unit to be distributed over all light-emitting units of the illumination system.

In an embodiment of the illumination system, the drive-unit is configured to switch off the second light-emitting unit and to switch on the first light-emitting unit during a time interval when the spoke transits between the second optical path. A benefit of this embodiment is that it allows the illumination system to substantially step-wise change over from a first color (associated with the second light-emitting unit during the first part of the spoke time) to a second color (associated with the first light-emitting unit and a next color segment). During the first part of the spoke time, the spoke transits the first optical path during which the first light-emitting unit is switched off. During a second part of the spoke time being the time interval during which the spoke transits the second optical path, the second light-emitting unit is switched off to prevent the color of the light emitted by the illumination system to gradually change. However, at the same time, a next segment of the color wheel is arranged in the first optical path, determining the color of the light emitting by the first light-emitting unit. By switching off the light of the second light-emitting unit and by switching on the light of the first light-emitting unit during the second part of the spoke time, the color emitted by the illumination system substantially step-wise changes from the first color to the second color.

Preferably, the first light-emitting unit is switched on only after the second light-emitting unit has been switched off which may generate a small time-window during the spoke time that the illumination system does not emit light.

In an embodiment of the illumination system, the drive-unit is further configured for increasing an intensity of the light emitting by the first light-emitting unit during the switching off of the second light-emitting unit. A benefit of this embodiment is that the increase of the intensity of the light emitted by the first light-emitting unit enables the intensity of the light emitted by the illumination system during the second part of the spoke time to be substantially equal to the intensity of the light emitted by the illumination system outside the spoke time.

In an embodiment of the illumination system, the illumination system further comprising a third light-emitting unit emitting light towards the light output window, the spoke being configured for sequentially transiting the first optical path of the first light-emitting unit, the second optical path of the second light-emitting unit and a third optical path between the third light-emitting unit and the light output window, wherein the drive-unit is configured to switch off the first light emitting unit and the second light-emitting unit when the spoke transits the second optical path, or wherein the drive-unit is configured to switch off the second light-emitting unit and the third light-emitting unit when the spoke transits the second optical path. Choosing which of the first light-emitting unit or the second light-emitting unit is switched off determines a moment during the spoke time when the color changes to a new color.

In an embodiment of the illumination system, the choice of the switching off of the first light-emitting unit or the third light-emitting unit when the spoke transits the second optical path is determined by an efficiency of the color generated by the different color segments. This embodiment may be especially beneficially when the color wheel comprises a luminescent material for converting, for example, blue light emitted from the light emitting units into red light and green light. As the conversion efficiency of the luminescent material for generating red light is typically relatively low, the intensity of the red light emitted by the illumination system when a phosphor wheel is used is relatively low. The moment of changing color during the spoke period may be chosen such that the time during which red light is emitted from the illumination system is relatively long compared to the time during which the remainder of the light is emitted. The switching sequence of the first light-emitting unit, the second light-emitting unit and the third light-emitting unit may even be different when the phosphor wheel changes from a segment generating green light to a segment generating red light compared to when the phosphor wheel changes from a segment generating red light to a segment generating blue light. This different switching sequence may, for example, be chosen such that the time during which the red light is emitted from the illumination system is the longest. This may be used to provide additional light intensity for the color of which the light intensity is lowest.

In an embodiment of the illumination system, the illumination system further comprises a light sensor for sensing the intensity of the light emitted by the illumination system. A benefit of this embodiment is that it allows an active controlling of the boosting of the second light-emitting unit or first light-emitting unit, for example, to ensure that the level of light emitted by the illumination system remains constant. Especially due to aging effects of the light-emitting units, the intensity of the light emitted by the individual light-emitting units may vary during its life cycle. By measuring the intensity of the light emitted by the illumination system via the light sensor, the drive-unit may adapt the intensity of the light emitted by the individual light-emitting unit to actively control the light level such that it remains constant.

In an embodiment of the illumination system, the first light-emitting unit comprises a first array of light emitters and wherein the second light-emitting unit comprises a second array of light emitters. A benefit of this embodiment is that the use of an array of light emitters in the first light-emitting unit and the second light-emitting unit enables an aspect ratio of the light source to substantially correspond to the aspect ratio of the image to be produced. This enables the illumination system and projection device to minimize the optics required to project the image and enables a minimization of the reduction of etendue.

In an embodiment of the illumination system, the first array of light emitters is arranged substantially parallel to the second array of light emitters, and wherein the first array of light emitters and the second array of light emitters are arranged substantially parallel to the spoke when the spoke is arranged between the light source and the light output window. A benefit of this embodiment is that this arrangement of the light emitters causes the time interval during which the spoke transits the optical path of the light source to be the shortest.

The invention further relates to a projection device as claimed in claim 11.

The invention also relates to a color wheel for use in an illumination system as claimed in claims 1 to 10, wherein the color wheel comprises collimating optics for collimating the light emitted by a color segment of the plurality of color segments towards the light output window of the illumination system. A benefit of this embodiment is that the integration of the collimating optics in the color wheel enables to limit an increase of the etendue of the illumination system. The etendue of the optical system is an important parameter in illumination systems. To have optimum efficiency of the illumination system and to limit a loss of light, the illumination system should be designed such that the increase of the etendue due to the light passing through the illumination system is as small as possible. Typically, in the known illumination systems which use both a collimator and a color wheel, the collimator is arranged between the color wheel and the light exit window of the known illumination system. In such a known configuration the distance between the color segment and the collimator is relatively large, causing an increase of the etendue of the illumination system. Especially when the color segment comprises a luminescent material for converting at least part of the light emitted by the light source into light of a different color, the light emitted by the luminescent material is emitted in substantially all directions. As such, the luminescent material, which is typically applied in a layer, may be considered as a Lambertian light emitter. To preserve the etendue or to limit the increase of etendue, the collimator preferably is positioned as close to the layer of luminescent material as possible. Also when the color segment comprises a diffusing element, this diffusing element also may be considered as a Lambertian light emitter. Also in such an embodiment, the collimator should be positioned as close to the diffusing element as possible to limit the increase of etendue. In the color wheel according to the invention, the color wheel comprises collimating optics. In such a configuration a distance between the layer of luminescent material and the collimating optics, or between the diffusing element and the collimating optics is relatively small such that the increase of etendue for the illumination system is limited, thus optimizing the efficiency of the illumination system according to the invention.

In an embodiment of the color wheel, the color wheel comprises a substrate comprising the plurality of color segments, wherein the substrate comprises the collimating optics. Generally the luminescent material of the color segment is applied as a layer on the substrate or may be integrated as particles in part of the substrate. The remainder of the substrate is generally used for stability of the color wheel. This remainder part of the substrate of the color wheel may be used for integrating the collimating optics.

In an embodiment of the color wheel, the collimating optics comprise a reflective element for collimating the light emitted by the color segment, and/or comprise a diffractive element for collimating the light emitted by the color segment, and/or comprise a refractive element arranged between the color segment and the light output window for collimating the light emitted by the color segment. A benefit of the embodiment when using the reflective element for collimation, is that the reflective element may be applied relatively easily at an edge of the color segment or applied as a reflective layer on the spoke between two adjacent color segments. A further benefit of the reflective element for collimating is that the reflective element does not introduce chromatic aberration when collimating. A benefit when using the diffractive element is that the diffractive element may be relatively easily applied, for example, on the color segment, for example, using printing techniques or embossing techniques. Furthermore, an effective diffractive collimating element may not require much height in the color wheel which allows the color wheel to remain relatively thin and compact. These diffractive elements may, for example, be a grating, for example, constituted of merlon structures constituted of two materials having different refractive index. A benefit of the embodiment when using the refractive element for collimating is that the collimating efficiency of the refractive element is larger compared to the reflective element due to the reflection losses in the reflective element. Furthermore, the refractive element may, for example, anticipate on a divergence of the light beam from the light source and may correct the divergence of the beam to collimate the light. For example, the color segment for the color blue may be a substantially transparent color segment for transmitting a light beam of the color blue emitted by the light source. In such an embodiment, the light beam emitted by the light source is already emitted predominantly in the predefined direction having a specific divergence. In such an embodiment, the refractive element may correct for the divergence of the emitted light beam and as such efficiently collimate the blue light. The refractive element may be a lens element, for example, integrated in the substrate, or may, for example, be a Fresnel-lens, for example, applied on top of the substrate. The refractive element may also be a cylindrical lens, for collimating substantially only in a single direction. In the color wheel, such a cylindrical lens may, for example, be shaped as a torus.

The color wheel according to the invention may also comprise a combination of the reflective element, the diffractive element and/or the refractive element. This combination of the reflective, diffractive and/or refractive elements may be applied at a single color segment. Alternatively, the reflective element may be applied at one color segment of the color wheel, the refractive element may be applied at a second color segment of the color wheel, and the diffractive element may be applied at a third color segment.

Furthermore, the collimating strength may differ for different color segments. For example, the color segment emitting the color blue typically is a substantially transparent color segment (in the embodiment in which the light source emits blue light). So the blue light is emitted in a light beam originating from the light source and typically requiring a different collimating strength compared to the other color segments in which the color segment, for example, comprises luminescent material which typically may be considered a Lambertian radiator. The refractive element may be constituted of a refractive-index gradient applied in the substrate which has a benefit that this may be fully integrated inside the substrate of the color wheel. Alternatively, the refractive element may, for example, be constituted of a Fresnel-type of lens which has a benefit that also this embodiment of the refractive element may be integrated in the substrate.

In an embodiment of the color wheel, the color segment comprises a reflective boundary arranged at least partially parallel to the optical path within the color segment for collimating the light emitted by the color segment in a tangential direction and/or in a radial direction. The reflective boundary extending in radial direction collimates light which spreads in tangential direction and the reflective boundary extending in tangential direction collimates light which spreads in radial direction. The reflective boundary may for example, be a further spoke which is not a boundary arranged between two adjacent color segments (as the spoke), but which is arranged inside a single color segment. Due to the applying of the further spoke the spreading of the light in a tangential direction is limited thus collimating the light in a tangential direction. In such an embodiment, the drive-unit may be configured to also switch off the first light-emitting unit during a time interval when the further spoke transits the first optical path. The reflective boundary may, alternatively, extend at least partially in tangential direction and may, for example, have a partial arc-shape, for example, arranged symmetrically with respect to a rotational axis of the color wheel. Such a reflective boundary would collimate the light emitted by the color segment in a radial direction.

BRIEF DESCRIPTION OF THE DRAWINGS

These and other aspects of the invention are apparent from and will be elucidated with reference to the embodiments described hereinafter.

In the drawings.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1A:
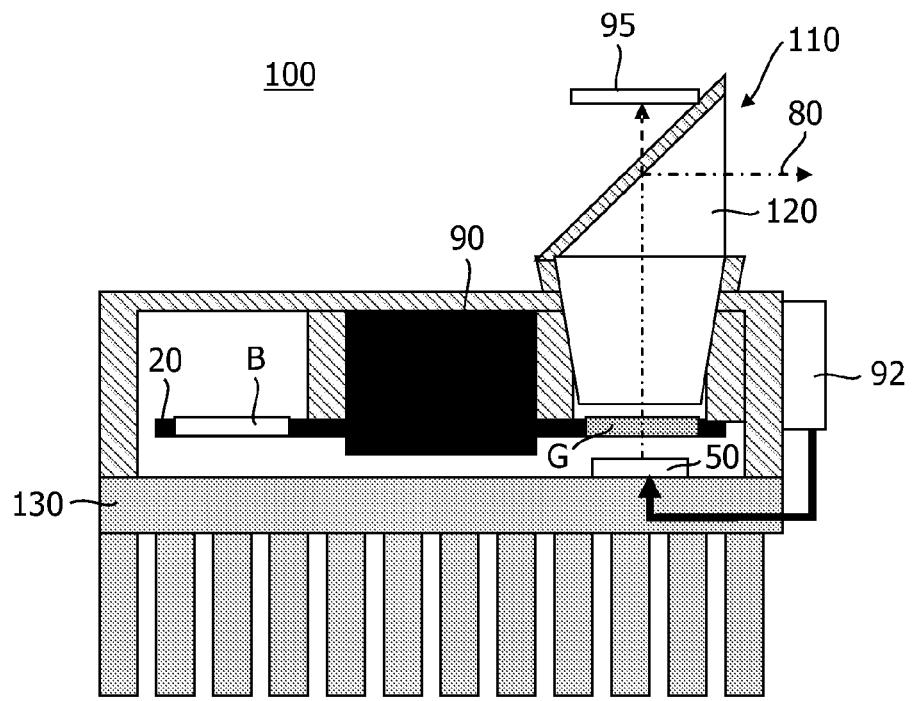
FIG. 1A shows a simplified cross-sectional view of an illumination system according to the invention.

FIG. 1A shows a simplified cross-sectional view of an illumination system 100 according to the invention. The illumination system 100 comprises a light source 10 (see FIGS. 1B and 1C), a color wheel 20 and a drive-unit 92 for driving the light source 10. The illumination system 100 as shown in FIG. 1A further comprises a motor 90 for driving the color wheel 20, a folding mirror 120 for redirecting the light emitted by the light source 10 towards the light output window 110, a light sensor 94 for sensing an intensity of the light emitted by the illumination system 100, and a heat sink 130 as cooling element for cooling the light source 10. The light emitted by the light source 10 follows an optical path 80 which is indicated in FIG. 1A by a dash-dotted line 80. The folding mirror 120, for example, is a semi-transparent mirror 120 which transmits part of the light emitted by the light source 10 towards the light sensor 94. The light source 10 comprises a first light-emitting unit 50 and a second light-emitting unit 60 (see FIGS. 1B and 1C), each emitting light via the color wheel 20 towards the light output window 110. The cross-sectional view of the color wheel 20 shown in FIG. 1A is along the line AA (see FIG. 1B) and consequently only shows the first light-emitting unit 50 of the light source 10. Preferably, the color of the light emitted by the first light-emitting unit 50 and the second light-emitting unit 60 is substantially identical and the color of the light emitted by the illumination system 100 is determined by the color wheel 20 together with the color of the light emitted by the light source 10. The color wheel 20 comprises different color segments R, G, B (see FIGS. 1B and 1C). By rotating the color wheel 20 a different segment will be arranged in the optical path 80 between the light source 10 and the light output window 110. The combination of the specific color segment R, G, B together with the color of the light source 10 determines the color of the light emitted by the illumination system 100.

The different segments R, G, B of the color wheel 20 may comprise color filters which each transmit light having one of the colors selected from, for example, red, green, blue, magenta, yellow and cyan. In such an embodiment, the light source 10 preferably emits substantially white light which comprises known quantities of the selected colors of the light. Alternatively, the different segments R, G, B comprise a layer comprising luminescent material which converts the light emitted by the light source 10 into light of the colors selected from red, green, blue, magenta, yellow and cyan. In such an embodiment, the light source 10 may, for example, emit ultraviolet light which can be converted by the individual luminescent layers into the colors required, or which, for example, may emit blue light. In the embodiment in which the light source 10 emits blue light, the luminescent material of the segment indicated with R absorbs the blue light and converts it into red light. The luminescent material of the segment indicated with G absorbs the blue light and converts it into green light. Preferably, the luminescent material of the segment indicated with R and the luminescent material of the segment indicated with G each comprises a specific dichroic mirror arranged on a side of the color wheel 20 facing the light source 10. The dichroic mirror arranged on the luminescent material of the segment indicated with G transmits the blue light and reflects the green light generated by the luminescent material. The dichroic mirror arranged on the luminescent material of the segment indicated with R transmits the blue light and reflects the red light generated by the luminescent material. Using the dichroic mirror, substantially all green light and red light generated in the luminescent material is emitted by the color wheel 20 in the direction of the light output window 110. The segment indicated with B does not contain a luminescent material and transmits the blue light from the light source 10. The benefit when using a layer of luminescent material on the color wheel 20 generating a phosphor wheel 20 is that a larger part of the light generated in the light source 10 is emitted from the illumination system 100, especially when the dichroic mirror is applied. In comparison: when the light source 10 emits substantially white light, at least 60% of the light is not used due to the color filters of the segments R, G, B absorbing all light apart from the light having the specific color. Furthermore, the use of a phosphor wheel 20 generates a remote phosphor configuration having the benefits of higher efficiency of the layer of luminescent material due to the lower temperature of the luminescent material and of the larger range of luminescent materials to be used on the phosphor wheel 20 due to the typical lower temperature of the luminescent material. Furthermore, the phosphor wheel 20 may be used in reflection. The benefit when using blue light emitted by the light source 10 is that there is not conversion of light required to generate blue light, which reduces the energy losses in the system. Furthermore, the Stokes-shift when using blue light for generating red light and green light is less compared to the Stokes-shift when using ultraviolet light for generating red light and green light, further reducing the energy losses in the system.

The color wheel 10 may comprise more than three segments and may generate together with the color of the light emitted by the light source 10 different colors than the listed red, green, blue, magenta, yellow and cyan.

In the known illumination system, the passing of a boundary between two adjacent color segments of a color wheel between the light source and the light output window generates a time window during which the color of the light changes gradually from a first color to a second color. The boundaries between two adjacent color segments are typically called spokes 40 and the time during which the spoke transits between the light source 10 and the light output window 110 is typically called spoke time Tsp (see FIG. 2). Because the color of the light emitted through the output window 110 during the spoke time period is not constant, the known illumination system either simply switch off the light source during the spoke time, reducing the brightness of the illumination system considerable, or the known illumination system comprises complex compensation techniques to still use the light emitted by the illumination system during the spoke time in an efficient and predictable manner. These latter known illumination systems, however, require complex data compensation.

In the illumination system 100 according to the invention light emitted during the spoke time Tsp may be used by, for example, a projection device without the need for complex compensation techniques. To this end, the first light-emitting unit 50, the second light-emitting unit 60 and the spokes 40 of the color wheel 20 are configured for preventing the spokes 40, when transiting the optical path 80 between the light source 10 and the light output window 110, to simultaneously transit a first optical path between the first light-emitting unit 50 and the light output window 110 and a second optical path between the second light-emitting unit 60 and the light output window 110. Furthermore, the drive-unit 92 is configured to switch off the first light-emitting unit 50 during a first part of the spoke time p1 (see FIG. 2) which a time interval during which the spoke 40 transits the first optical path. The first optical path and the second optical path are substantially separated when the light impinges on the color wheel 20. However, after the light of the first light-emitting unit 50 and the second light-emitting unit 60, the first optical path and the second optical path may wholly or partially overlap, for example, in an integrating optics (not shown) which may be used to improve a uniformity of the light emitted by the illumination system 100 across the light output window 110.

Figures 1B, 1C:
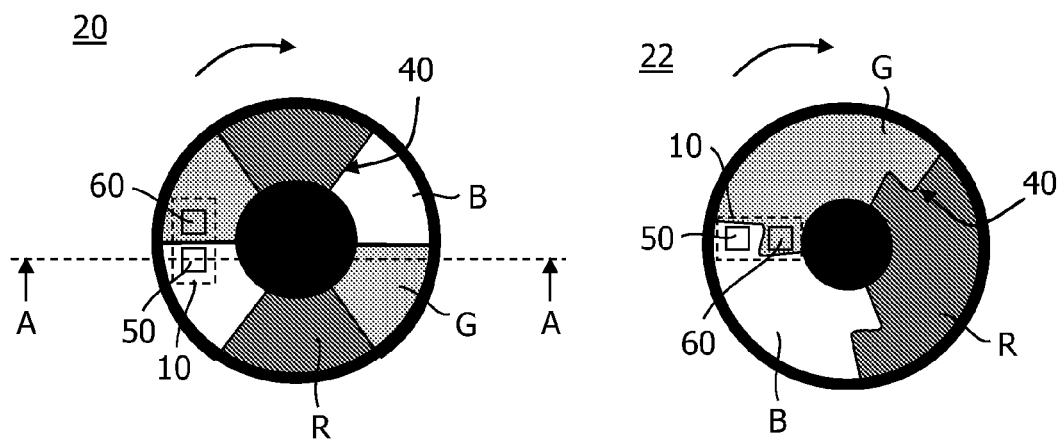
FIGS. 1B and 1C show different embodiments of a color wheel together with an arrangement of the first light-emitting unit and second light-emitting unit relative to the color wheel according to the invention, FIGS. 2A, 2B, 2C and 2D each show a plurality of arrays of light emitters shown in a time sequence while a boundary between two segments transits between the light source and the light output window.

To prevent the spoke 40 to simultaneously transit the first optical path and the second optical path, the positioning of the first light-emitting unit 50 may be placed next to the second light-emitting unit 60 in a tangential direction as is shown in FIG. 1B. FIG. 1B shows the color wheel 20 together with the light source 10 constituted of the first light-emitting unit 50 and the second light-emitting unit 60. Due to the placement of the second light-emitting unit 60 next to the first light-emitting unit 50 in the tangential direction the spoke 40 first transits the first optical path and subsequently transits the second optical path. An alternative way to prevent the spoke 40 to simultaneously transit the first optical path and the second optical path is by a shaping of the spoke 40 as shown in FIG. 1C. FIG. 1C also shows the color wheel 22 together with the light source 10 constituted of the first light-emitting unit 50 and the second light-emitting unit 60. Now the second light-emitting 60 unit is placed next to the first light-emitting unit 50 in a radial direction. However, the shape of the spoke 40 causes the spoke 40 to first transit the first optical path and subsequently transits the second optical path.

Considering that the color segment indicated with G is located between the light source 10 and the light output window 110. As a consequence, the color of the light emitted by the illumination system 100 is green. When rotating the color wheel 20, 22, 24 in the direction of the arrow, a spoke 40 representing the boundary 40 between the color segment indicated with G and the color segment indicated with B will transit the optical path 80 between the light source 10 and the light output window 110. In both configurations as shown in FIGS. 1B and 1C, the spoke 40 will first transit the first optical path between the first light-emitting unit 50 and the light output window 110 during the first part of the spoke time p1. The drive-unit 92 switches off the first light-emitting unit 50 during the first part of the spoke time p1, while maintaining the second light-emitting unit 60 to emit light. The color of the light emitted by the illumination system 100 still is green, although the intensity may be half the intensity when both the first light-emitting unit 50 and the second light-emitting unit 60 would be switched on. To overcome the reduced intensity of the light emitted by the illumination system 100, the drive-unit 92 may boost the light output of the second light-emitting unit 60 during the first part of the spoke time p1. After the spoke 40 has transited the first optical path, the color segment indicated with B is located between the first light-emitting unit 50 and the light output window 110. When the color wheel 20 continues to rotate, it will transit the second optical path between the second light-emitting unit 60 and the light output window 110 during the second part of the spoke time p2 (see FIG. 2). During the second part of the spoke time p2, the drive-unit 92 may switch off the second light-emitting unit 60 and may switch on the first light-emitting unit 50. At that time, the color of the light emitted by the illumination system 100 abruptly changes from green to blue, because to the color segment indicated with B is located between the first light-emitting unit 50 and the light output window 110. Because there is no gradual change from green to blue, the light emitted by the illumination system may easily be used by a projection system without complex compensation techniques. To ensure that the intensity of the light emitted by the illumination system during the second part of the spoke time p2 is substantially equal to the intensity of the light emitted by the illumination system outside the spoke time Tsp, the drive-unit 92 may boost the output of the first light-emitting unit during the second part of the spoke time p2.

To prevent any mixing of light resulting from different segments R, G, B of the color wheel 20, 22, 24, there may be a brief time interval between the first part of the spoke time p1 and the second part of the spoke time p2 during which no light is emitted. This may especially be done when the color wheel 20, 22, 24 comprises a luminescent material to prevent mixing of light due to afterglow effects of the luminescent materials.

The light source 10 may comprise any light-emitting unit 50, 60, for example, light emitting diodes, laser diodes, or other small bright light sources. A benefit when using light emitting diodes and/or laser diodes is that these light-emitting units may relatively easily be boosted during a short time to emit an increased amount of light.

These different stages when the spoke 40 transits between the light source 10, 12, 14 and the light output window 110 are shown in FIGS. 2A to 2D and FIGS. 3A to 3D. FIGS. 2E and 3E each show the spoke time Tsp and a series of parts of spoke times p1, p2; p1, p2, p3 during which the first light-emitting unit 50 and/or the second light-emitting unit 60 and/or a third light-emitting unit 70 may be switched on, boosted or switched off.

FIGS. 2A, 2B, 2C and 2D each show the light source 12 being constituted of the first light-emitting unit 50 and the second light-emitting unit 60. The first light-emitting unit 50 is constituted of a first array of light emitters 52, 54, 56 and the second light-emitting unit 60 is constituted of a second array of light emitters 62, 64, 66. Each of the first array of light emitters 52, 54, 56 and the second array of light emitters 62, 64, 66 are substantially arranged parallel to the spoke 40 when the spoke 40 transits the first array of light emitters 52, 54, 56 and the second array of light emitters 62, 64, 66, respectively. The FIGS. 2A to 2D show a time sequence during which the spoke 40 transits the light source 12. The spoke 40 moves in the direction indicated by the arrow.

Figure 2A:
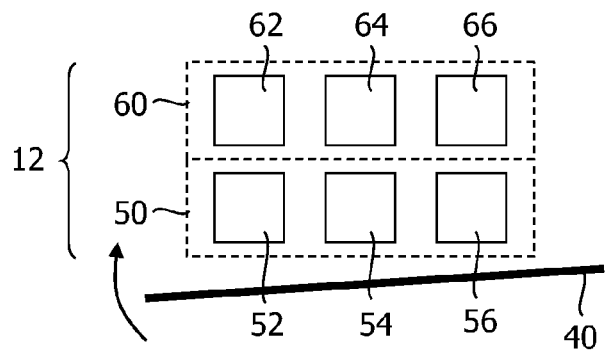
FIG. 2E illustrates a light intensity emitted by a first light-emitting unit and a second light-emitting unit in time and illustrates a color emitted by the illumination system, FIGS. 3A, 3B, 3C and 3D each show a different embodiment of a plurality of arrays of light emitters shown in a time sequence while the boundary between two segments transits between the light source and the light output window.

FIG. 2A shows a situation when both the first light-emitting unit 50 and the second light-emitting unit 60 emit light towards the light output window 110 via the same segment R, G, B of the color wheel 20. This corresponds to a light output of the illumination system 100 during a time outside the spoke time Tsp. Both the first array of light emitters 52, 54, 56 and the second array of light emitters 62, 64, 66 will be switched on.

Figure 2B:
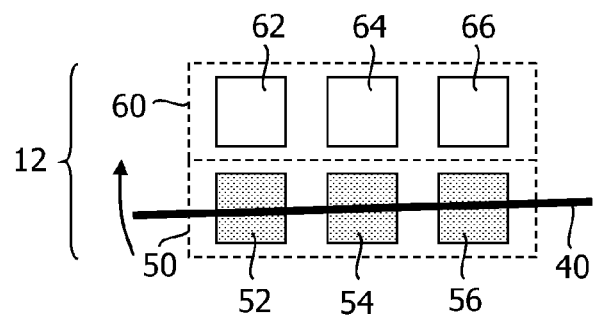

FIG. 2B shows a situation in which the spoke 40 transits the first optical path. This time interval is indicated as the first part of the spoke time p1 (see FIG. 2E). During the first part of the spoke time p1, the first array of light emitters 52, 54, 56 is switched off, while the second array of light emitters 62, 64, 66 remains switched on, preferably at boosted intensity.

Figure 2C:
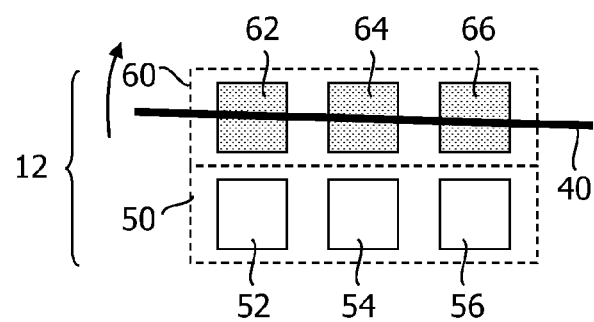

FIG. 2C shows a situation in which the spoke 40 transits the second optical path. This time interval is indicated as the second part of the spoke time p2 (see FIG. 2E). During the second part of the spoke time p2, the second array of light emitters 62, 64, 66 is switched off, while the first array of light emitters 52, 54, 56 is switched on, preferably at boosted intensity.

At this stage, the color of the light emitted by the illumination system 100 changes as is indicated in FIG. 2E by the bottom graph indicated with 'Out'.

Figure 2D:
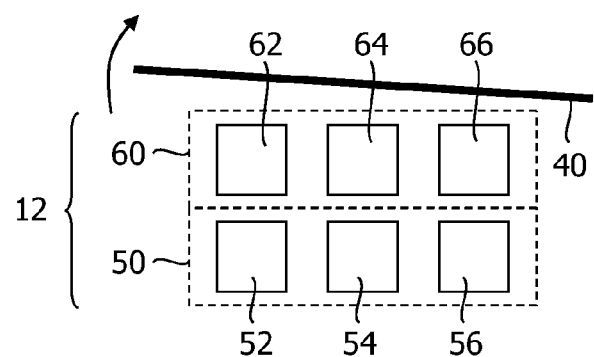
Figure 2E:
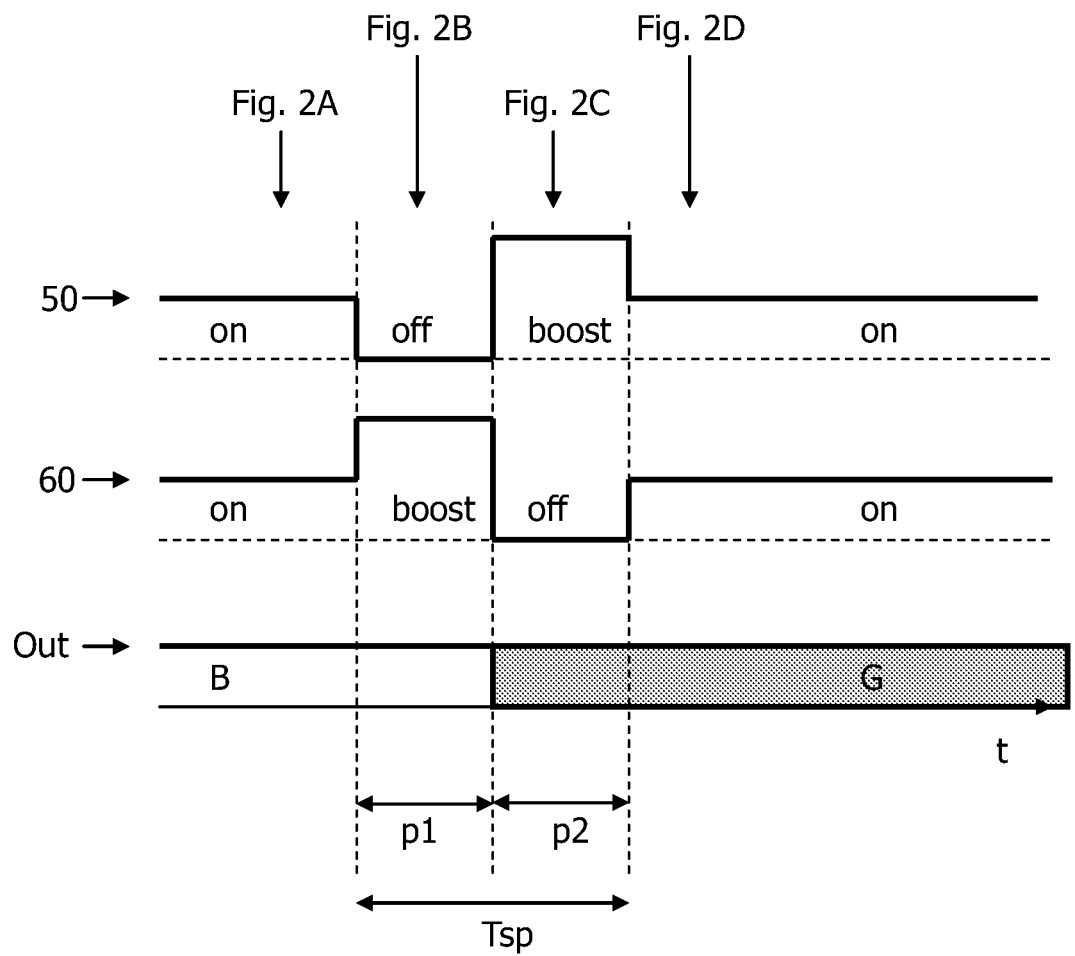

FIG. 2D shows a situation in which the spoke 40 has transited the light source 12. When switching on the second array of light emitters 62, 64, 66 and reducing the intensity of the first array of light emitters 52, 54, 56 to the intensity level outside the spoke time Tsp, both the first light-emitting unit 50 and the second light-emitting unit 60 emit light towards the light output window 110 via the same segment R, G, B of the color wheel 20.

These four stages are also shown in FIG. 2E. The first graph indicated with reference number 50 indicates the light output intensity over time t of the first light-emitting unit 50. In the first graph also the status of the first light-emitting unit 50 is indicated by the wordings 'on', 'off' and 'boost', indicating when the first light-emitting unit 50 is switched on, switched off and when the output intensity of the first light-emitting unit 50 is boosted, respectively. The second graph indicated with reference number 60 indicates the light output intensity over time t of the second light-emitting unit 60. In the second graph also the status of the second light-emitting unit 60 is indicated by the wordings 'on', 'off' and 'boost', indicating when the second light-emitting unit 60 is switched on, switched off and when the output intensity of the second light-emitting unit 60 is boosted, respectively. The third graph indicated with the text-label 'Out' indicates the light output intensity over time t of the illumination system 100. Furthermore, the third graph shows the color of the light which half way in the spoke time changes from blue (indicated with reference number B) to green (indicated with reference number G). The third graph also shows that the output intensity of the illumination system 100 maintains substantially constant during the spoke time Tsp and shows that the color of the light emitted by the illumination system 100 does not gradually change from blue light into green light (as the known illumination systems have) but abruptly changes between the first part of the spoke time p1 and the second part of the spoke time p2. Due to this abrupt change in color, the light emitted by the illumination system 100 during the spoke time Tsp may easily be used by a projection device 200 without the need for complex compensation techniques.

FIGS. 3A, 3B, 3C and 3D each show different embodiment of the light source 14. The light source 14 shown in FIG. 3 is constituted of the first light-emitting unit 50, the second light-emitting unit 60 and a third light emitting unit 70. The first light-emitting unit 50 is constituted of the first array of light emitters 52, 54, the second light-emitting unit 60 is constituted of the second array of light emitters 62, 64 and the third light-emitting unit 70 is constituted of a third array of light emitters 72, 74. Again, each of the first array of light emitters 52, 54, the second array of light emitters 62, 64 and the third array light emitters 72, 74 are substantially arranged parallel to the spoke 40 when the spoke 40 transits the first array of light emitters 52, 54, the second array of light emitters 62, 64 and the third array of light emitters 72, 74, respectively. The FIGS. 3A to 3D show a time sequence during which the spoke 40 transits the light source 14. The spoke 40 moves in the direction indicated by the arrow.

Figure 3A:
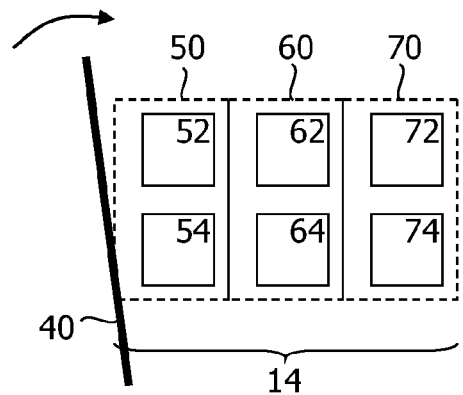
FIG. 3E illustrates a light intensity emitted by the first light-emitting unit, the second light-emitting unit and a third light-emitting unit in time and illustrates the color emitted by the illumination system.

FIG. 3A shows a situation when both the first, second and third light-emitting unit 50, 60, 70 each emit light towards the light output window 110 via the same segment R, G, B of the color wheel 20. This corresponds to a light output of the illumination system 100 during a time outside the spoke time Tsp. All arrays of light emitters 52, 54; 62, 64; 72, 74 are switched on.

Figure 3B:
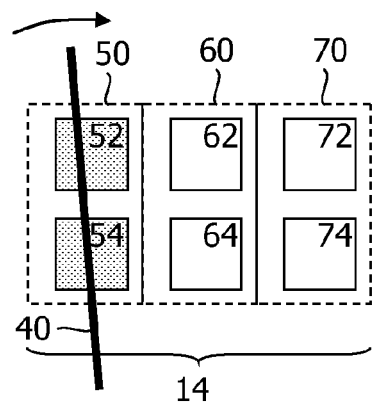
Figure 3C:
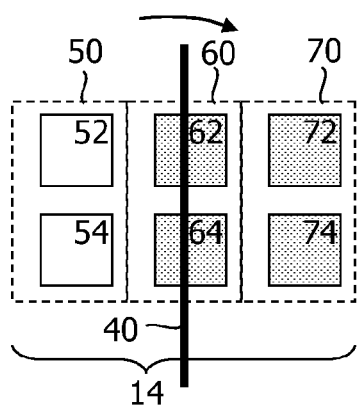
Figure 3D:
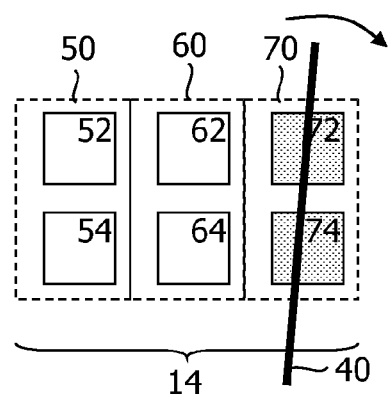
Figure 3E:
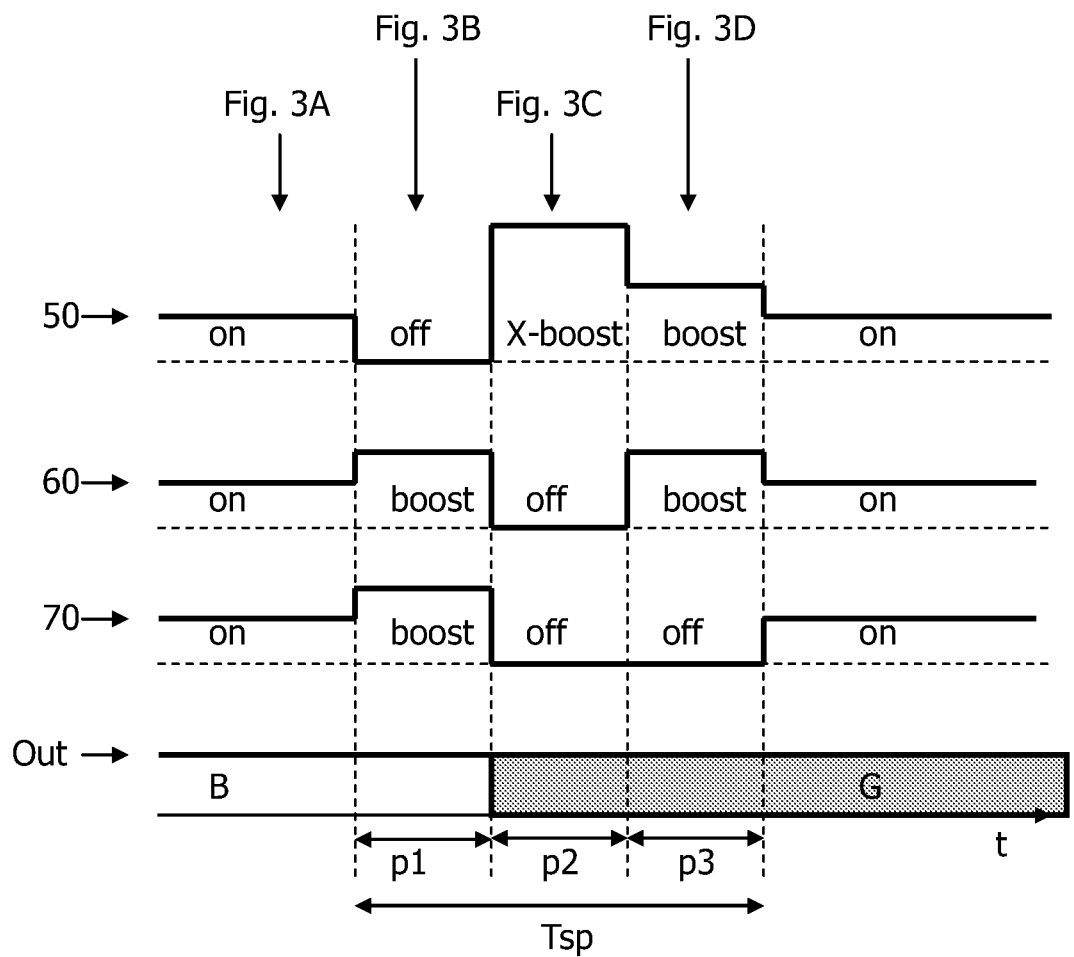

FIG. 3B shows a situation in which the spoke 40 transits the first optical path during the first part of the spoke time p1 (see FIG. 3E). During this first part of the spoke time p1, the first array of light emitters 52, 54 is switched off, while the second array of light emitters 62, 64 and the third array of light emitters 72, 74 remains switched on. To ensure that the intensity of the light emitted during the first part of the spoke time p1 remains substantially constant, the second array of light emitters 62, 64 and the third array of light emitters 72, 74 may be boosted to emit a higher intensity of light.

FIG. 3C shows a situation in which the spoke 40 transits the second optical path during the second part of the spoke time p2 (see FIG. 3E). During this second part of the spoke time p2, the second array of light emitters 62, 64 is switched off to prevent the color of the light emitted by the illumination system to gradually change color. In the embodiment shown in FIGS. 3A to 3E the first array of light emitters 52, 54 is switched on again during the second part of the spoke time p2, while the third array of light emitters 72, 74 is switched off. As a consequence, the first light emitting array 52, 54 together with the part of the color segment R, G, B which is arranged in the optical path of the first light emitting array 52, 54 determines the color of the light emitted by the illumination system 100. So the color of the light emitted by the illumination system 100 changes between the first part of the spoke time p1 and the second part of the spoke time p2. To ensure that the intensity of the light emitted during the second part of the spoke time p2 remains substantially constant compared to the first part of the spoke time p1, the first array of light emitters 52, 54 may be boosted to emit a higher intensity of light. This is indicated in FIG. 3E by a higher pulse during the second part of the spoke time p2 and by the text label "X-boost". The label 'X-boost' also indicates that the intensity of the first array of light emitters 52, 54 must be boosted more than the second array of light emitters 62, 64 and the third array of light emitters 72, 74 such that the intensity of the light emitted by the illumination system 100 remains substantially constant.

In an alternative embodiment, the first array of light emitters 52, 54 may remain switched off during the second part of the spoke time p2 and the third array of light emitters 72, 74 may be further boosted such that the intensity of the light emitted by the illumination system 100 remains substantially constant. In this embodiment, the color of the light emitted by the illumination system 100 does not yet change between the first part of the spoke time p1 and the second part of the spoke time p2, but between the second part of the spoke time p2 and a third part of the spoke time p3 (see FIG. 3E).

From the previous example, it is clear that the moment of changing color during the spoke period Tsp (see FIG. 3E) may be chosen by choosing which of the light emitting units 50, 60, 70 is switched 'on' or 'off'. This may beneficially be used when the color wheel comprises a luminescent material for converting, for example, blue light emitted from the light emitting units 50, 60, 70 into red light and green light. As the conversion efficiency of the luminescent material for generating red light is relatively low, the intensity of the red light emitted by the illumination system 100 when a phosphor wheel 20 is used is relatively low. The moment of changing color during the spoke period Tsp may be chosen such that the time during which red light is emitted from the illumination system 100 is relatively long compared to the time during which the remainder of the light is emitted. For example, when a first spoke 40 being a boundary between a color segment generating the color green G and a color segment generating the color red R transits the optical path 80 of the light source 10, the sequence which of the light emitting units 50, 60, 70 is switched 'off' may be different compared to when a second spoke 40 being a boundary between the color segment generating the color red R and a color segment generating the color blue B transits the optical path 80. This different switching sequence may, for example, be chosen such that the time during which the red light is emitted from the illumination system 100 is the longest. This may be used to provide additional light intensity for the color of which the light intensity is lowest.

In an even further embodiment, the first array of light emitters 52, 54 may be switched on during the second part of the spoke time p2 and the third array of light emitters may remain switched on during the second part of the spoke time p2. As a result, the color of the light emitted by the illumination system 100 changes, because the color of the light emitted by the first array of light emitters 52, 54 is determined by a different color segment of the color wheel 20 compared to the color of the light emitted by the third array of light emitters 72, 74. When, for example, the color wheel 20 comprises a color segment R generating the color red, a color segment B generating the color blue and a color segment G generating the color green, the color emitted by the current embodiment according to the invention is an intermediate color, for example, yellow (being a combination of red and green), magenta (being a combination of red and blue) and cyan (being a combination of green and blue). The intermediate color of the light emitted by the illumination system 100 during the second part of the spoke time p2 is different compared to the color of the light emitted by the illumination system 100, but remains substantially constant during the second part of the spoke time p2. This enables the projection device 200 to relatively easily use the light emitted by the illumination system 100 during the second part of the spoke time p2.

FIG. 3D shows a situation in which the spoke 40 transits a third optical path between the third light-emitting unit 70 and the light output window 110 during the third part of the spoke time p3 (see FIG. 3E). During this third part of the spoke time p3, the first array of light emitters 52, 54 and the second array of light emitters 62, 64 are switched on, while the third array of light emitters 72, 74 is switched off. To ensure that the intensity of the light emitted during the third part of the spoke time p3 remains substantially constant, the first array of light emitters 52, 54 and the second array of light emitters 62, 64 may be boosted to emit a higher intensity of light.

In the embodiment in which an intermediate color is emitted by the illumination system 100 during the second part of the spoke time p2, the color emitted by the illumination system 100 will again change between the second part of the spoke time p2 and the third part of the spoke time p3. During the third part of the spoke time p3 the first light-emitting unit 50 and the second light-emitting unit 60 each emit light towards the light output window 110 via the same segment R, G, B of the color wheel 20 which determines the color of the light emitted by the illumination system 100.

A next situation in which the spoke 40 has transited the light source 14 is not shown and is substantially identical to FIG. 2D. After the third part of the spoke time p3 the third array of light emitters 72, 74 are switched on again and the intensity of the light emitted by the first array of light emitters 52, 54 and the second array of light emitters 62, 64 are reduced again to the intensity level outside the spoke time Tsp. The first light-emitting unit 50, the second light-emitting unit 60 and the third light-emitting unit 70 each emit light towards the light output window 110 via the same segment R, G, B of the color wheel 20.

These five stages are also shown in FIG. 3E. The first graph indicated with reference number 50 indicates the light output intensity over time t of the first light-emitting unit 50. In the first graph also the status of the first light-emitting unit 50 is indicated by the wordings 'on', 'off', 'boost' and 'X-boost', indicating when the first light-emitting unit 50 is switched on, switched off and when the output intensity of the first light-emitting unit 50 is boosted or boosted more, respectively. The second graph indicated with reference number 60 indicates the light output intensity over time t of the second light-emitting unit 60. In the second graph also the status of the second light-emitting unit 60 is indicated by the wordings 'on', 'off' and 'boost', indicating when the second light-emitting unit 60 is switched on, switched off and when the output intensity of the second light-emitting unit 60 is boosted, respectively. The third graph indicated with reference number 70 indicates the light output intensity over time t of the third light-emitting unit 70. In the third graph also the status of the third light-emitting unit 70 is indicated by the wordings 'on', 'off' and 'boost', indicating when the third light-emitting unit 70 is switched on, switched off and when the output intensity of the second light-emitting unit 60 is boosted, respectively. The fourth graph indicated with the text-label 'Out' indicates the light output intensity over time t of the illumination system 100. Furthermore, the fourth graph shows the color of the light which changes from blue (indicated with reference number B) to green (indicated with reference number G) between the first part of the spoke time p1 and the second part of the spoke time p2. The fourth graph also shows that the output intensity of the illumination system 100 maintains substantially constant during the spoke time Tsp and shows that the color of the light emitted by the illumination system 100 does not gradually change from blue light into green light (as the known illumination systems have) but abruptly changes between the first part of the spoke time p1 and the second part of the spoke time p2. Due to this abrupt change in color, the light emitted by the illumination system 100 during the spoke time Tsp may easily be used by a projection device 200 without the need for complex compensation techniques.

Figure 4:
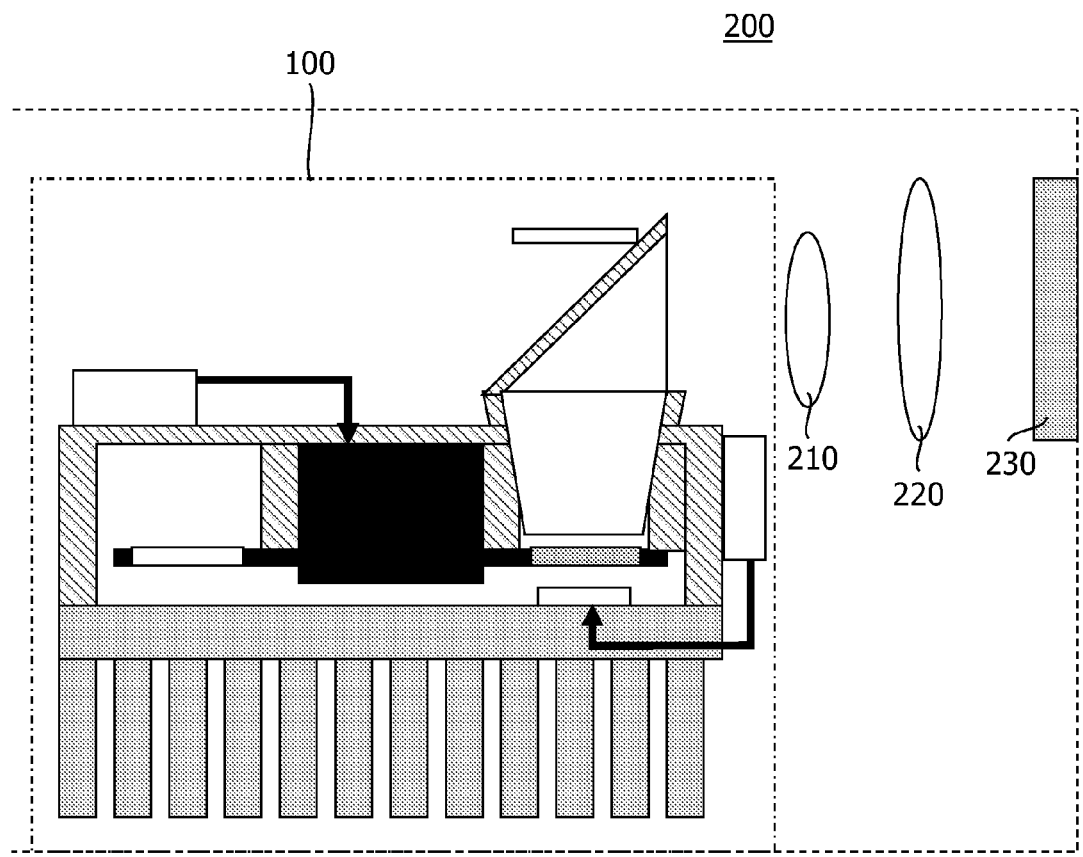
FIG. 4 shows a projection device comprising the illumination system according to the invention.

FIG. 4 shows a projection device 200 comprising the illumination system 100 according to the invention. The projection device 200 comprises an expander lens 210 and a field lens 220 for projecting the light emitted by the illumination system 100 on the digital light processing unit 230. The digital light processing unit 230 subsequently generates the image via transmission through light valves or via reflection from an array of micro-mirrors which is subsequently projected on a wall or on a screen.

Figure 5A:
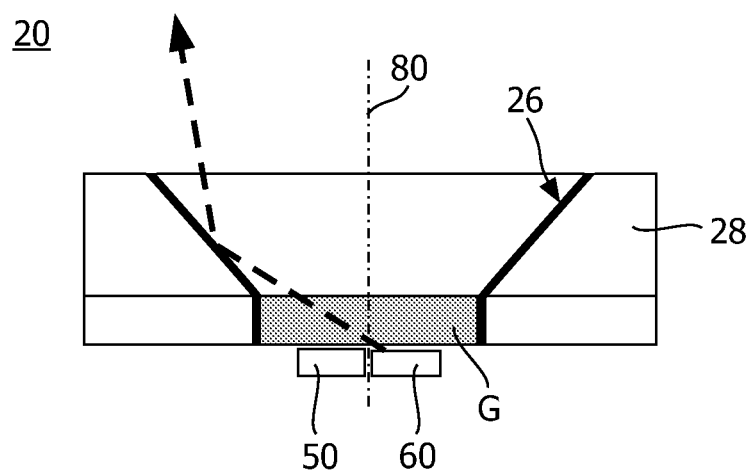
FIGS. 5A, 5B, 5C, 5D, 5E and 5F show a cross-sectional view and a top-view of further embodiments of the color wheel according to the invention.
Figure 5B:
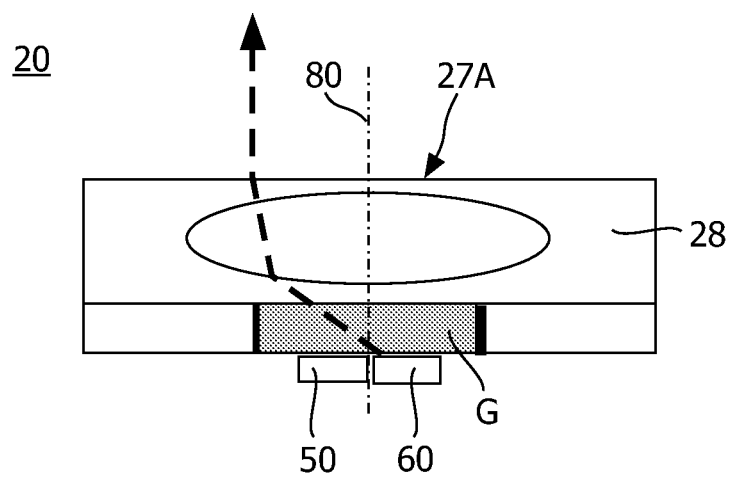
Figure 5C:
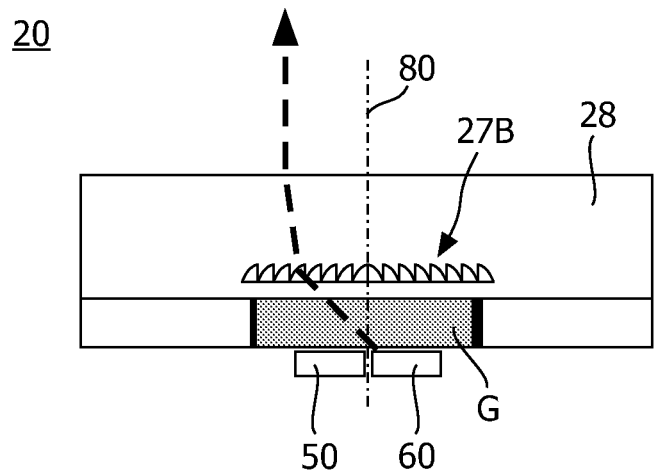
Figure 5D:
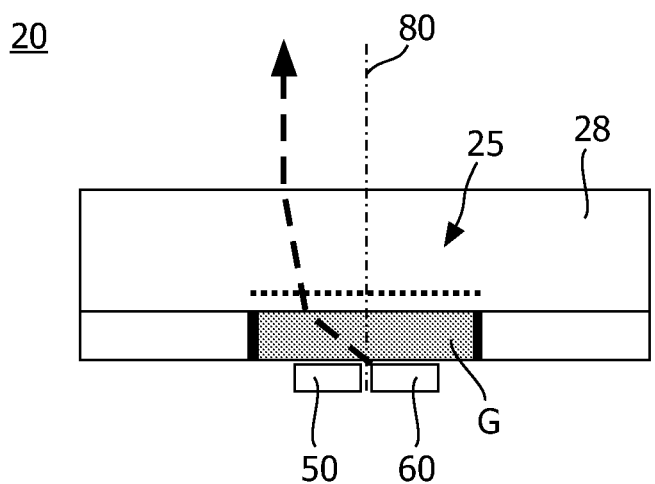

FIGS. 5A, 5B, 5C, 5D, 5E and 5F show a cross-sectional view and a top-view of further embodiments of the color wheel according to the invention. In FIGS. 5A, 5B, 5C and 5D a cross-sectional view of the color wheel 20, 22, 24 is shown in which the embodiment shown in FIG. 5A shows a reflective element 26 for collimating the light, in which the embodiment shown in FIGS. 5B and 5C show refractive elements 27A and 27B for collimating the light, and in which the embodiment shown in FIG. 5D shows a diffractive element 25 for collimating the light. The color wheel 20, 22, 24 comprises a substrate 28. The luminescent material of the color segment G is applied as a layer on the substrate 28 and is indicated in FIGS. 5A, 5B, 5C and 5D as a grey area. The luminescent material may be applied as a layer or may be integrated as particles in part of the substrate 28 (not shown). The remainder of the substrate 28 is generally used for stability of the color wheel 20, 22, 24. This remainder part of the substrate 28 of the color wheel 20, 22, 24 may be used for integrating the collimating optics 25, 26, 27A, 27B. Due to the integration of the collimating optics 25, 26, 27A, 27B in the substrate 28 of the color wheel 20, 22, 24, the increase of etendue of the illumination system is limited thus improving the efficiency of the illumination system 100.

FIG. 5A shows the collimating optics 26 comprising a reflective element 26. The reflective element 26 may be applied relatively easily at an edge of the color segment R, G, B or applied as a reflective layer on the spoke 40 between two adjacent color segments R, G, B. Preferably the reflective element 26 is arranged as a reflector-cup (see cross-section of FIG. 5A), however, the reflective element 26 may also be arranged substantially parallel to the optical path 80. The dashed arrow indicates a light beam emitted by the light emitting element 60 which is collimated by the reflective element 26.

FIG. 5B shows the collimating optics 27A comprising a refractive element 27A. The refractive element 27A may be constituted of a refractive-index gradient (not shown) applied in the substrate 28 which has a benefit that this may be fully integrated inside the substrate of the color wheel. Alternatively, the refractive element 27A may, for example, be a lens 27A integrated in the substrate 28.

FIG. 5C shows the collimating optics 27B comprising a Fresnel-type of lens 27B which may, for example, be applied on a surface of the substrate 28 on which the luminescent layer is applied (not shown), or may be integrated in the substrate 28 of the color wheel 20. In such an embodiment, the distance between the collimating optics 27B and the color segment G may be relatively small. Furthermore, the benefit when using the Fresnel-type of lens 27B is that a thickness of the substrate 28 may be limited allowing to limit a thickness of the color wheel 20. The dashed arrow indicates a light beam emitted by the light emitting element 60 which is collimated by the refractive element 27B.

FIG. 5D shows the collimating optics 25 comprising a diffraction grating 25 which may, for example, be applied on a surface of the substrate 28 (not shown) or which may, for example, be applied on a surface of the luminescent material G (not shown) or which may be integrated in the substrate 28. The diffractive element 25 may be relatively easily applied, for example, using printing techniques or embossing techniques. Furthermore, the use of the diffractive element 25 allows a thickness of the collimating optics to be limited, allowing to limit a thickness of the color wheel 20. These diffractive elements 25 may, for example, be a grating 25, for example, constituted of merlon structures constituted of two materials having different refractive index.

The color wheel 20, 22, 24 according to the invention may also comprise a combination of the reflective element 26, diffractive element 25 and/or the refractive element 27A, 27B. This combination of collimation elements 25, 26, 27A, 27B may be applied at a single color segment R; G; B. Alternatively, the reflective element 26 may be applied at one color segment R, G, B of the color wheel 20, 22, 24 and the refractive element 27A, 27B may be applied at a second color segment R, G, B of the color wheel 20, 22, 24.

Figure 5E:
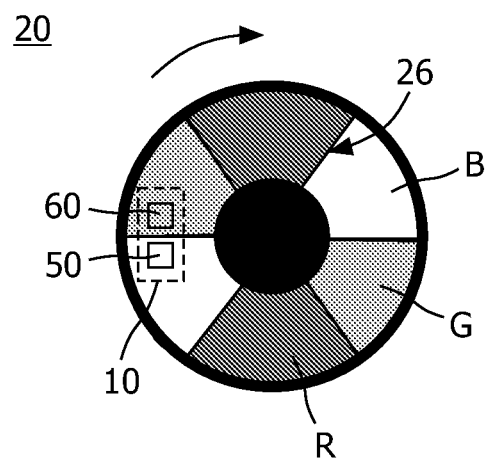

FIG. 5E shows a top-view of the color wheel 20 according to the invention. The color wheel 20 shown in FIG. 5E is substantially identical to the color wheel 20 shown in FIG. 1B, but now with the reflective element 26 applied as the spoke 40 (see FIGS. 1B and 1C) or with the reflective element 26 applied on the spoke 40. In the embodiment shown in FIG. 5E the reflective element 26 is arranged substantially parallel to the optical path 80 and thus the width of the spoke 40 will substantially not increase (will only increase by a thickness of the reflective layer constituting the reflective element 26). Alternatively, when the reflective element 26 is arranged as a reflective cup (see FIG. 5A), the dimension of the spoke 40 in tangential direction will increase. To still be able to reduce the spoke time of the illumination system 100 (see FIG. 1A), a distance between the first light-emitting unit 50 (see FIGS. 1B and 1C) and the second light-emitting unit 60 (see FIGS. 1B and 1C) must be adapted such that the spoke 40 does not simultaneously transits the first optical path between the first light-emitting unit 50 and the light output window 110 and the second optical path between the second light-emitting unit 60 and the light output window 110.

Figure 5F:
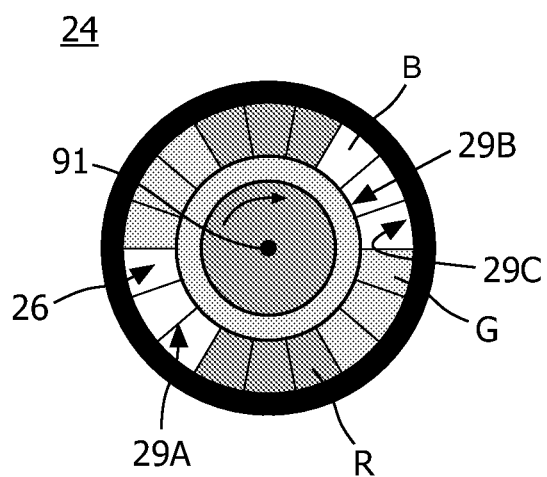

FIG. 5F shows a top-view of a further embodiment of the color wheel 24 according to the invention. In this embodiment, the color segment R, G, B comprises a reflective boundary 29A, 29B, 29C arranged at least partially parallel to the optical path 80 within the color segment R, G, B for collimating the light emitted by the color segment R, G, B in a tangential direction and/or in a radial direction. The reflective boundary 29A may be a further spoke 29A which is not a boundary arranged between two adjacent color segments R, G, B (as the spoke 40), but which is arranged inside a single color segment R, G, B. Due to the applying of the reflective boundary 29A the spreading of the light in a tangential direction is limited thus collimating the light in a tangential direction. In such an embodiment, the drive-unit 92 may be configured to also switch off the first light-emitting unit 50 during a time interval when the further spoke 29 transits the first optical path. Also the further spoke 29A may alternatively be arranged at an angle inclined with respect to the optical axis 80 such as one of the reflective elements 26 of the reflective cup as shown in FIG. 5A. In such an embodiment, the dimensions of the further spoke 29A increases in tangential direction.

The reflective boundary 29B, 29C may also be a boundary arranged in tangential direction for limiting the spreading of the light in radial direction. Such a reflective boundary 29B, 29C may, for example, have a partial arc-shape, for example, arranged symmetrically with respect to a rotational axis 91 of the color wheel 24. Such a reflective boundary 29B, 29C would collimate the light emitted by the color segment in radial direction. Alternatively, the reflective boundary 29B, 29C may have any other shape for collimating light, for example, partially in the radial direction and partially in tangential direction.

It will be apparent to a person skilled in the art that the color wheel 20, 22, 24 comprising collimating optics 25, 26, 27A, 27B, 29A, 29B, 29C, as disclosed herein may be applied separate from the illumination system, so without the use of the drive unit 92 for reducing the spoke time, and without the use of the light source 10, 12, 14 having the first and second light-emitting unit 50, 60.

The invention also relates to a method of driving a light source 10, 12, 14 in an illumination system 100 for a projection device 200. The illumination system 100 comprises a light source 10, 12, 14, a color wheel 20, 22, 24 and a drive-unit 92 for driving the light source 10, 12, 14. The color wheel 20, 22, 24 comprises a plurality of color segments R, G, B determining a color of the light emitted by the illumination system 100. The color wheel 20, 22, 24 is configured for sequentially positioning color segments R, G, B from the plurality of color segments R, G, B in an optical path 80 between the light source 10, 12, 14 and the light output window 110 by rotating the color wheel 20, 22, 24. A spoke 40 of the color wheel 20, 22, 24 being a boundary 40 between two adjacent color segments R, G, B. The illumination system 100 further comprises the light source 10, 12, 14 comprising a first light-emitting unit 50 and a second light-emitting unit 60, each of the first light-emitting unit 50 and second light-emitting unit 60 emitting light towards a light output window 110 of the illumination system 100. The first light-emitting unit 50, the second light-emitting unit 60 and the spoke 40 are configured for preventing the spoke 40 when transiting the optical path 80 between the light source 10, 12, 14 and the light output window 110, to simultaneously transit a first optical path between the first light-emitting unit 50 and the light output window 110 and a second optical path between the second light-emitting unit 60 and the light output window 110. The method of driving the light source 10, 12, 14 comprises the step of: switching off the first light-emitting unit 50 during a time interval p1 (see FIGS. 2E and 3E) when the spoke 40 transits the first optical path.

The method further comprises the step of: increasing an intensity of the light emitting by the second light-emitting unit 60 during the switching off of the first light-emitting unit 50.

The invention also relates to a computer program product for performing the method as indicated in the previous paragraph.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system for a projection device, the illumination system comprising:
 a light source;
 a color wheel; and
 a drive-unit for driving the light source,
 the color wheel comprising a plurality of color filter segments determining a color of the light emitted by the illumination system, the color wheel being configured for sequentially positioning color filter segments from the plurality of color filter segments in an optical path between the light source and a light output window of the illumination system by rotating the color wheel, a spoke of the color wheel being a boundary between two adjacent color segments,
 the light source comprising a first light-emitting unit and a second light-emitting unit, each emitting light towards the light output window of the illumination system,
 the first light-emitting unit, the second light-emitting unit and the spoke being configured for preventing the spoke when transiting the optical path between the light source and the light output window to simultaneously transit a first optical path between the first light-emitting unit and the light output window and a second optical path between the second light-emitting unit and the light output window, wherein the color wheel is disposed in the first optical path and in the second optical path, the drive-unit being configured for switching off the first light-emitting unit during a time interval when the spoke transits the first optical path.

2. The illumination system as claimed in claim 1, wherein a positioning of the first light-emitting unit with respect to the second light-emitting unit prevents the spoke to simultaneously transit the first optical path and the second optical path, or wherein a shape of the spoke prevents the spoke to simultaneously transit the first optical path and the second optical path.

3. The illumination system as claimed in claim 1, wherein the drive-unit is further configured for increasing an intensity of the light emitting by the second light-emitting unit during the switching off of the first light-emitting unit.

4. The illumination system as claimed in claim 1, wherein the drive-unit is configured to switch off the second light-emitting unit and to switch on the first light-emitting unit during a time interval when the spoke transits the second optical path.

5. The illumination system as claimed in claim 4, wherein the drive-unit is further configured for increasing an intensity of the light emitting by the first light-emitting unit during the switching off of the second light-emitting unit.

6. The illumination system as claimed in claim 1, the illumination system further comprising a third light-emitting unit emitting light towards the light output window, the spoke being configured for sequentially transiting the first optical path of the first light-emitting unit, the second optical path of the second light-emitting unit and a third optical path between the third light-emitting unit and the light output window, wherein the drive-unit is configured to switch off the first light emitting unit and the second light-emitting unit when the spoke transits the second optical path, or wherein the drive-unit is configured to switch off the second light-emitting unit and the third light-emitting unit when the spoke transits the second optical path.

7. The illumination system as claimed in claim 6, wherein the choice of the switching off of the first light-emitting unit or the third light-emitting unit when the spoke transits the second optical path is determined by an efficiency of the color generated by the different color segments.

8. The illumination system as claimed in claim 1, wherein the illumination system further comprises a light sensor for sensing the intensity of the light emitted by the illumination system.

9. The illumination system as claimed in claim 1, wherein the first light-emitting unit comprises a first array of light emitters and wherein the second light-emitting unit comprises a second array of light emitters and wherein the third light-emitting unit comprises a third array of light emitters.

10. The illumination system as claimed in claim 9, wherein the first array of light emitters is arranged substantially parallel to the second array of light emitters, and wherein the first array of light emitters and the second array of light emitters are arranged substantially parallel to the spoke when the spoke is arranged between the light source and the light output window.

11. The illumination system as claimed in claim 1, wherein the color wheel comprises collimating optics for collimating the light emitted by a color filter segment of the plurality of color segments towards the light output window of the illumination system.

12. The illumination system as claimed in claim 11, wherein the color wheel comprises a substrate comprising the plurality of color filter segments, wherein the substrate comprises the collimating optics.

13. The illumination system as claimed in claim 11, wherein the collimating optics comprise at least one of a reflective element for collimating the light emitted by the color filter segment, a diffractive element for collimating the light emitted by the color filter segment, or a refractive element arranged between the color filter segment and the light output window for collimating the light emitted by the color filter segment.

14. The illumination system as claimed in claim 11, wherein the color filter segment comprises a reflective boundary arranged at least partially parallel to the optical path within the color filter segment for collimating the light emitted by the color filter segment in at least one of a tangential direction or in a radial direction.

* * * * *